INVENTOR.
Calvin C. Covert
Clifford B. Wright
BY
Craig V. Morrow
Attorney

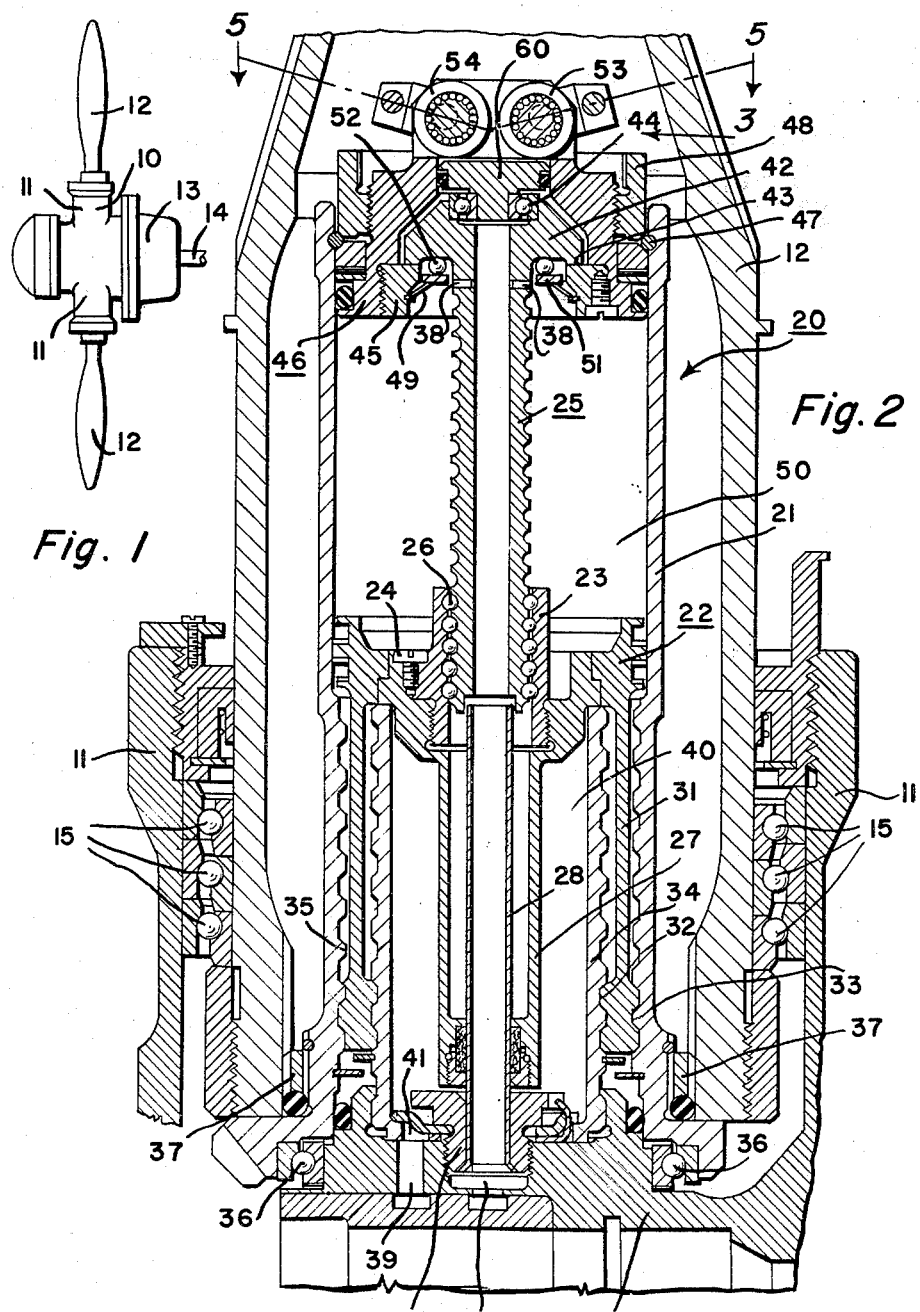

United States Patent Office 2,958,382
Patented Nov. 1, 1960

2,958,382

LOCKING MEANS FOR PITCH CHANGING MOTOR

Calvin C. Covert, Vandalia, and Clifford B. Wright, Tipp City, Ohio, assignors to General Motors Corporation, Detroit, Mich., a corporation of Delaware Filed Apr. 20, 1954, Ser. No. 424,316

8 Claims. (Cl. 170—160.33)

This invention pertains to variable pitch propellers, and particularly to a self-locking servo-motor for adjusting the pitch position of propeller blades.

Heretofore, servo-motors for use in variable pitch propellers have embodied means for locking the motor, and, hence, the propeller blade, or blades, associated therewith, against movement upon a loss of pressure in the actuating system. A servo-motor of this type is disclosed and claimed in copending application, Serial No. 279,376, filed March 29, 1953, in the name of Morton Brooks, et al., now abandoned. However, it has been discovered that it is desirable to incorporate speed responsive means for actuating the locking means of the servo-motor upon a loss of pressure in the actuating system when the propeller is rotating, and, yet, arrange the locking means so that the motor will be unlocked under static conditions irrespective of the lack of pressure in the actuating system. Accordingly, among our objects are the provision of a self-locking servo-motor including means for unlocking the servo-motor under static conditions; the further provision of a servo-motor including centrifugally responsive means for locking the servo-motor upon a loss of pressure; and the still further provision of a self-locking servo-motor including counterbalanced, centrifugally responsive weights, which facilitate unlocking the servo-motor under static conditions.

The aforementioned and other objects are accomplished in the present invention by incorporating pressure releasable, centrifugally engageable locking means in a servo-motor designed particularly for adjusting the pitch position of a blade in a variable pitch propeller. Specifically, the servo-motor comprises a cylinder having disposed therein a reciprocable piston capable of fluid pressure actuation in both directions. The piston divides the cylinder into an increase pitch chamber and a decrease pitch chamber, the piston being operatively connected with the blade, of a variable pitch propeller such that reciprocation of the piston will impart rotation to the blade. The piston carries a hollow member having internal spiral threads, which hollow member forms a nut of the well known ball-screw and nut coupling. The nut is attached to the piston such that relative rotation therebetween is prevented.

The nut threadedly engages a hollow screw shaft having a complementary spiral groove, through the agency of a plurality of circulating balls. The screw shaft is rotatably supported within the cylinder, and it will be appreciated that reciprocation of the piston is dependent upon relative rotation between the nut and the screw shaft. More particularly, inasmuch as the nut is restrained against rotation, movement of the piston is dependent upon rotation of the screw shaft.

One end of the screw shaft is formed with an annular member that is disposed in contiguous relation to an annular member attached to the cylinder head. These annular members constitute the locking means for restraining rotation of the screw shaft. In the embodiment disclosed, the braking, or locking, surfaces are normally maintained out of engagement by means of a Belleville spring. The cylinder head supports a lock release plunger, which is operable under the urge of fluid pressure to assist the Belleville spring in maintaining the locking surfaces disengaged.

The cylinder head also carries a pair of counterbalanced, centrifugally responsive flyweights, which are operatively interconnected with a pair of eccentrics which oppose movement of the lock release plunger, under the urge of fluid pressure. Normally, a sufficient pressure is maintained in the cylinder chamber above the servo-motor piston so that the lock release plunger may maintain the locking means released by overcoming the thrust of centrifugal force on the flyweights. However, upon a loss of pressure fluid in the servo-motor cylinder, the flyweights will respond to the thrust of centrifugal force and effect movement of the piston and screw shaft axially so as to engage the locking means and thereby prevent rotation of the screw shaft.

Under static conditions centrifugal weights are so counterbalanced that the lock releasing plunger may be moved so as to release the locking means solely by a means of the belleville spring. Thus, under static conditions, the servo-motor and, hence, propeller pitch is not locked. Moreover, in certain types of installations wherein the servo-motor is used in conjunction with propeller blades having an inherent tendency to shift to a lesser pitch position due to aerodynamic and centrifugal twisting moments, the locking means, or the brake, becomes self-energizing after initial engagement by the centrifugally responsive weights.

Further objects and advantages of the present invention will be apparent from the following description, reference being had to the accompanying drawings wherein a preferred embodiment of the present invention is clearly shown, and wherein similar reference characters denote similar parts throughout the several views.

In the drawings:

Fig. 1 is a view, in elevation, of a variable pitch propeller incorporating the servo-motor of this invention.

Fig. 2 is a sectional view of the servo-motor of this invention disclosed in conjunction with a propeller blade.

Figure 3:
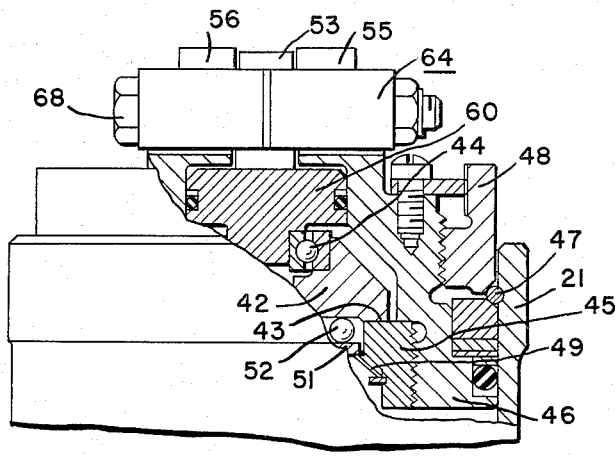
Fig. 3 is a fragmentary view, partly in elevation and partly in section, taken generally in the direction of arrow 3 in Fig. 2.

With particular reference to Fig. 1, a variable pitch propeller assembly is shown including a hub 10 having a plurality of radially extending sockets 11 within which propeller blades 12 are journaled for rotation about their longitudinal axes. The hub 10 has attached thereto and rotatable therewith a regulator assembly 13, which houses the actuating system for the servo-motor, to be described. The hub 10 and the regulator 13 are connected to rotate with an engine driven shaft 14. Structurally, the variable pitch propeller, shown in Fig. 1, may be constructed according to the Blanchard, et al. Patents 2,307,101 and 2,307,102.

With particular reference to Fig. 2, it may be seen that a propeller blade 12 has a hollow root portion, and is supported for rotation about its longitudinal axis to different pitch positions by means of stack bearings 15 within the hub socket 11. The servo-motor of this invention may be disposed within the hollow root portion of the propeller blade 10, as depicted by the numeral 20.

The servo-motor 20 comprises a cylinder 21 having disposed therein a reciprocable piston 22 capable of fluid pressure actuation in both directions, and having equal areas exposed to the cylinder chambers. The piston 22 is formed with a central recess within which a hollow nut member 23 having an internal spiral groove of semi-circular configuration, is retained. The nut 23 is securely attached to the head of piston 22 by means of screw devices, such as the one indicated by numeral 24, such that relative rotation between the piston and nut is precluded. The nut 23 threadedly engages a hollow screw shaft 25 through the agency of a plurality of circulating balls 26. Thus, the nut 23, the screw shaft 25, and the balls 26 constitute the well known ball-screw and nut coupling, it being understood that suitable passage means are formed on the nut 23 to permit circulation of the balls 26. It will further be appreciated that by using circulating balls to interconnect the nut and screw shaft, a substantially frictionless coupling is obtained. With couplings of this character, it has been determined that a lead, or pitch angle of 3° is sufficient to obtain relative rotation between the nut and screw shaft under free-fall conditions. However, it is preferred to employ lead angle of substantially 6° for the spiral grooves on both the nut and screw shaft, inasmuch as higher lead angles permit easier turning of the screw shaft relative to the nut, although requiring a greater force to lock the screw shaft against rotation.

As shown in Fig. 2, the piston 22 is formed with a hollow cylindrical section 27 coaxially disposed within the cylinder 21, the section 27 sealingly engaging a transfer tube 28 adjacent its lower end. The transfer tube 28 is attached to the hub 10 by means of a nut 29 and communicates with a hub passage 30. The piston 22 is also formed with an axially extending skirt 31 having internal and external helical splines 32 and 33. The internal helical splines 32 mesh with helical splines on a member 34 attached to the hub and are restrained against rotation. Thus, the member 34 may be called the fixed spline member. The external helical splines 33 of the skirt 31 mesh with internal helical splines 35 formed on the cylinder 21, the cylinder 21 being rotatably supported by bearing means 36, and operatively connected to the blade 12 through a straight splined indexing ring 37. From the foregoing, it will be apparent that reciprocation of the piston 22 within the cylinder 21, by reason of the spline arrangement, will impart rotation to the cylinder 21 and the blade 12. However, the particular means for converting reciprocation of the piston into rotation of the blade 21 constitute no part of this invention, and it will be readily appreciated that resort may be had to other means for accomplishing this result, within the scope of this invention.

The piston 22 divides the cylinder 21 into an increase pitch chamber 40 and a decrease pitch chamber 50. The decrease pitch chamber 50 is connected with the hub passage 30 through the hollow transfer tube 28, the hollow screw shaft 25 and a plurality of circumferentially spaced openings 38 in the screw shaft. The increase pitch chamber 40 is connected to a hub passage 39 through a passage 41 in the fixed spline member 34. Thus, it will be appreciated that when pressure fluid is applied to the increase pitch chamber 40, while the decrease pitch chamber 50 is connected to drain, piston 22 will move upwardly, as viewed in Fig. 2, movement of the piston 22 being dependent upon rotation of the screw shaft 25. Conversely, when pressure fluid is applied to chamber 50 and chamber 40 is connected to drain, the piston 22 will move downwardly, as viewed in Fig. 2, also dependent upon rotation of screw shaft 25.

The screw shaft 25 is formed with a head surface 42 having an annular portion 43, which constitutes a brake surface. The head portion 42 is operatively associated with a thrust bearing 44, the outer race of which is carried by the head portion 42 and the inner race of which is carried by a lock release plunger 60, to be described.

The shoulder 43 is disposed in contiguous relation to an annular member 45 constituting the stationary brake surface, the member 45 being carried by a cylinder head assembly 46. The cylinder head assembly 46 is retained in position by means of a snap ring 47 and a retaining nut 48. The stationary member 45 supports a Belleville spring 49, which, in turn, supports a race 51 of a bearing 52 for rotatably supporting the screw shaft 25 within the cylinder. Under static conditions, the Belleville spring 49 will impart axial movement to the screw shaft 25 so as to separate the braking surfaces of member 45 and shoulder 43.

Figure 4:
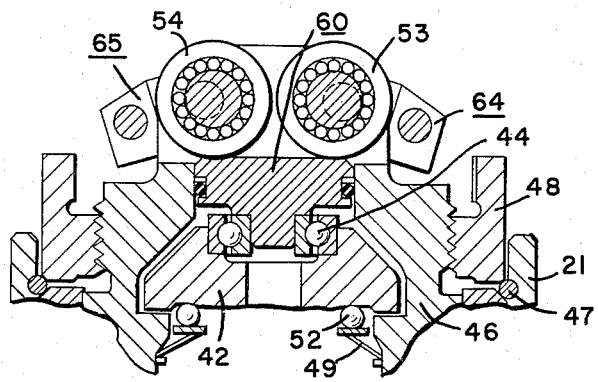
Fig. 4 is a fragmentary, sectional view depicting the position of the weights when the locking means are released.

With particular reference to Figs. 2 through 4, the lock release plunger 60 is arranged for reciprocable movement within the member 46. The head surface of plunger 60 engages a pair of sleeves 53 and 54, the sleeves 53 and 54 being capable of transverse movement relative to the member 46.

Figure 5:
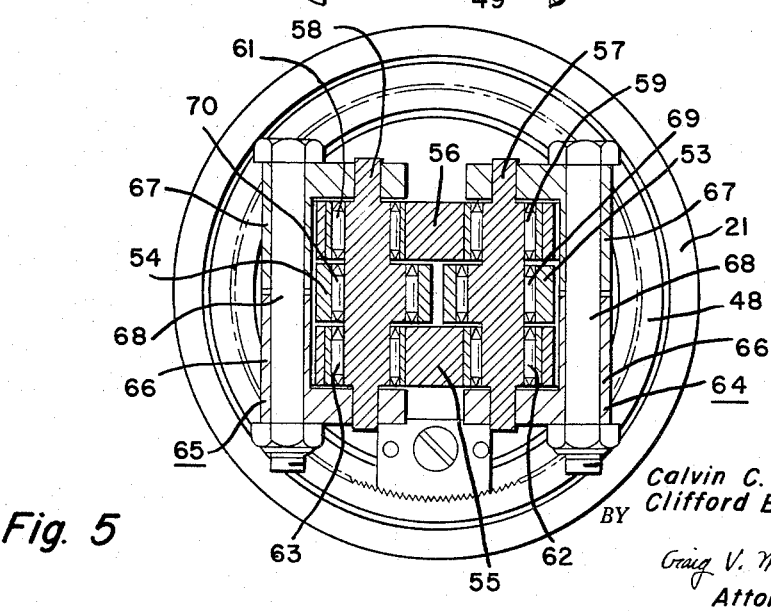
Fig. 5 is a sectional view taken along line 5—5 of Fig. 2.

As is seen particularly in Figs. 3 and 5, the head member 46 is formed with a bifurcated portion constituted by spaced brackets 55 and 56. The brackets are formed with aligned openings within which eccentrics 57 and 58 are rotatably supported by needle bearings 59, 61, 62 and 63. The eccentric 57 is connected to rotate with a counterbalanced flyweight 64, and eccentric 58 is connected to rotate with a counterbalance flyweight 65.

Each of the flyweights 64 and 65 comprises, as shown in Fig. 5, a pair of generally L-shaped members 66 and 67, which are interconnected by a through bolt 68. The flyweights 64 and 65 are capable of rotation relative to the brackets 55 and 56 throughout an angle of substantially 30° from the position of Fig. 4 to the position of Fig. 2. The eccentrics 57 and 58 are encompassed by sleeves 53 and 54, needle bearings 69 and 70 being disposed therebetween. Accordingly, upon rotation of the eccentrics from the position of Fig. 3 to the position of Fig. 1, the sleeves 53 and 54 will be moved downwardly, thereby urging plunger 60 downwardly and moving surface 43 into engagement with member 45, through thrust bearing 44.

It is well recognized that some types of propeller blades have an inherent tendency to rotate about their longitudinal axes towards a low pitch position due to aerodynamic and centrifugal twisting moments caused by movement of the craft through the air and rotation of the propeller. Thus, if the actuating system for positioning the propeller blades should fail, the blades would move to a low angle position, which might cause a mishap if the craft is air-borne. The servo-motor of this invention is operable to lock the blades in fixed pitch position, while the propeller is rotating upon a failure in the actuating system.

As disclosed in the aforementioned copending application, Serial No. 279,376, a predetermined minimum pressure is maintained at all times in the decrease pitch chamber 50, this pressure being sufficient to move the lock release plunger 60 to the position shown in Fig. 4 wherein the locking means are released. It will further be understood that even though the decrease pitch chamber 50 is connected to drain, this predetermined pressure potential is maintained therein so as to maintain the locking means disengaged, thereby permitting rotation of the screw shaft 25 and reciprocation of the piston 22. Thus, during proper operation of the actuating system, as evidenced by the maintenance of a minimum pressure potential in the decrease pitch chamber, the lock release plunger 60 will maintain the flyweights 64 and 65 in the position of Fig. 4 at all times. However, should the actuating system malfunction, thereby causing a loss of pressure in the decrease pitch chamber 50, the centrifugal flyweights 64 and 65 will move outwardly to the position of Fig. 2, thereby moving the plunger 60 and the screw shaft 25 axially so that the locking means constituted by surfaces 43 and 45 are in engagement. Accordingly, rotation of the screw shaft 25 will be prevented, and as a consequence thereof, the piston 22 is restrained against reciprocation and the propeller blade 12 is locked against rotation about its longitudinal axis.

However, under static conditions, that is, with the propeller stationary and in the absence of minimum pressure potential in the decrease pitch chamber 50, the locking means will be released, inasmuch as the flyweights 64 and 65 are counterbalanced. Thus, under static conditions, the flyweights 64 and 65 will assume the position of Fig. 4, thereby enabling the Belleville spring 49 to move the screw shaft 25 and the plunger 60 axially, thereby releasing the locking means.

Operation

When the propeller is rotating, and the fluid pressure system for actuating the servo-motor is operating properly, the predetermined pressure potential maintained in decrease pitch chamber 50 will maintain the locking means released, as shown in Fig. 3, by actuating lock release plunger 60. Accordingly, the piston 22 is free to move in either direction, linear movement of the piston being dependent upon rotation of the screw shaft 25. In this manner, the pitch position of the propeller blade 12 may be adjusted either automatically under the control of any well known governing mechanism to maintain constant speed propeller operation, or manually to select a predetermined blade pitch position. Upon failure of the fluid pressure system and a loss of pressure in the chamber 50, the thrust of centrifugal force on the flyweights 64 and 65 will rotate the eccentrics 57 and 58, thereby imparting transverse movement to the sleeves 53 and 54 from the position of Fig. 4 to the position of Fig. 2. Accordingly, the shoulder 43 will be moved into engagement with the member 45, and frictional engagement therebetween will preclude rotation of the shaft 25. Moreover, inasmuch as the blades of the propeller are subject to a torque which tends to reduce their pitch position, this force will be transmitted to the piston and will tend to urge the piston 22 downwardly, thereby increasing the braking force, and, in effect, rendering the brake self-energizing after initial engagement between the shoulder 43 and the member 45. The blades will now be locked in the pitch position they were in when the pressure failure occurred, and the blades will be maintained in this position while the propeller is rotating, until pressure is again restored to the system.

However, when the aircraft has been safely landed with the propellers at a fixed pitch position, and the propeller is in a static condition, the counterbalanced centrifugal weights 64 and 65 will rotate to the position of Fig. 4, thereby imparting upward transverse movement to the sleeves 53 and 54. In this manner, the locking means will be released by the Belleville spring 49 to permit adjustment of the pitch position of the blades by an auxiliary source of fluid pressure, which is usually provided in the fluid pressure system, but which ordinarily does produce a sufficient pressure potential to release the locking means by the application of pressure fluid to decrease pitch chamber 50.

From the aforegoing it is apparent that the present invention provides centrifugally actuated locking means for maintaining a propeller blade at a fixed pitch position upon a failure in the actuating system for the pitch adjusting servo-motor. Moreover, by employing counterbalanced centrifugal flyweights, the locking means are automatically released under static conditions.

While the embodiment of the present invention as herein disclosed, constitutes a preferred form, it is to be understood that other forms might be adopted.

What is claimed is as follows:

1. In a variable pitch propeller having a blade rotatable about its longitudinal axis, a servo-motor for adjusting the pitch position of said blade by imparting rotation thereto about its longitudinal axis, said servo-motor including a cylinder having disposed therein a reciprocable piston capable of fluid pressure actuation in both directions, means interconnecting the piston and the blade for imparting rotation to said blade upon reciprocation of said piston, mechanical locking means operatively engageable with said piston for mechanically preventing movement thereof in either direction during the absence of a predetermined pressure potential in said cylinder, and actuating means operatively connected with said locking means including centrifugally responsive weights.

2. The combination with a rotatable propeller having an adjustable pitch blade mounted for rotation about its longitudinal axis; of a servo-motor for adjusting the pitch position of said blade, said servo-motor including a cylinder having disposed therein a reciprocable piston capable of fluid pressure actuation in both directions, means interconnecting the piston and said blade for imparting rotation thereto about its longitudinal axis upon reciprocation of said piston, a rotatable element in said cylinder and operatively connected to said piston such that reciprocation of said piston is dependent upon rotation of said element, and centrifugally operable, pressure responsive mechanical locking means operatively engageable with said element and carried by said propeller so as to be rotatable therewith for mechanically preventing rotation of said element in the absence of a predetermined pressure potential in said cylinder.

3. In combination, a servo-motor, a rotatable propeller having a blade capable of rotation about its longitudinal axis to different pitch positions, said servo-motor being disposed within said blade and including, a cylinder having disposed therein a piston capable of fluid pressure actuation in both directions, means interconnecting said piston and said blade for adjusting the pitch position thereof upon reciprocation of said piston, an element mounted for rotation within said cylinder and operatively connected with said piston such that reciprocation of said piston is dependent upon rotation of said element, means disposed within said cylinder and operatively associated with said element for locking said element against rotation, and centrifugally responsive means operatively connected to said locking means for actuating the same in the absence of a predetermined pressure potential in said cylinder.

4. The combination set forth in claim 3 wherein said locking means comprises a pair of brake members, one of said brake members being attached to said cylinder and the other of said brake members constituting a part of said rotatable element, and resilient means for maintaining said brake members separated when the propeller is stationary.

5. In combination, a servo-motor, a rotatable propeller having a blade capable of rotation about its longitudinal axis to different pitch positions, said servo-motor including, a cylinder, a reciprocable piston disposed in said cylinder capable of fluid pressure actuation in both directions, means interconnecting the piston and the blade whereby reciprocation of the piston will adjust the pitch position of said blade, a member supported for rotation within said cylinder and operatively connected to the piston such that reciprocation of said piston is dependent upon rotation of said member, the operative connection between said member and said piston including an element carried by said piston and restrained against rotation relative thereto, and centrifugally operable, pressure responsive means operatively connected to said member for preventing rotation thereof during rotation of said propeller in the absence of a predetermined pressure potential in said cylinder.

6. The combination set forth in claim 5 wherein the centrifugally operable, pressure responsive means include a pair of engageable brake elements, one of said elements being attached to said cylinder and the other of said elements constituting a part of said rotatable member, and a pair of flyweights operatively interconnected with said brake elements for moving said brake elements into engagement in the absence of said predetermined pressure potential in said cylinder.

7. The combination set forth in claim 6 wherein the operative connection between said centrifugally responsive flyweights and said brake elements comprises a pair of eccentrics capable of rotation by said flyweights, a pair of sleeves encompassing said eccentrics and capable of transverse movement upon rotation of said eccentrics, and means operatively associated with said rotatable member and said sleeves for imparting axial movement to said rotatable member upon transverse movement of said sleeves.

8. In combination, a servo motor, a rotatable propeller having a blade capable of rotation about its longitudinal axis to different pitch positions, said servo motor including a cylinder having disposed therein a reciprocable piston capable of fluid pressure actuation in both directions, means interconnecting the piston and said blade for adjusting the pitch position thereof in response to piston reciprocation, locking means operatively connected with said piston for preventing reciprocation thereof, means operable to release said locking means when a predetermined pressure potential is obtained in said cylinder, and centrifugally responsive means rotatable with said propeller and operatively connected with said locking means for rendering the same operative in the absence of said predetermined pressure potential in said cylinder during rotation of said propeller, said means for releasing the locking means comprising a lock release plunger operatively connected with said centrifugally responsive means and capable of fluid pressure actuation during the maintenance of said predetermined pressure potential in said cylinder, said centrifugally responsive means including a pair of counter-balanced flyweights pivotally mounted on the cylinder and responsive to the thrust of centrifugal force during propeller rotation, said weights engaging said plunger to oppose fluid pressure actuation of said plunger during propeller rotation such that during the absence of said predetermined pressure potential in said cylinder the locking means will be engaged, said counterbalanced flyweights permitting the locking means to be released when the propeller is stationary in the absence of said predetermined pressure potential in said cylinder.

References Cited in the file of this patent
UNITED STATES PATENTS

| | | |
|---|---|---|
| 2,320,195 | Rindfleisch | May 25, 1943 |
| 2,404,290 | Hoover | July 16, 1946 |
| 2,477,868 | Forman | Aug. 2, 1949 |
| 2,527,022 | May et al. | Oct. 24, 1950 |
| 2,578,350 | Greene | Dec. 11, 1951 |
| 2,653,671 | Martin et al. | Sept. 29, 1953 |
| 2,745,499 | Berninger et al. | May 15, 1956 |
| 2,748,877 | Miller et al. | June 5, 1956 |
| 2,796,137 | Lambeck | June 18, 1957 |